No. 888,080. PATENTED MAY 19, 1908.
J. GOHY.
MACHINE FOR PERFORATING PAPER TUBES.
APPLICATION FILED NOV. 6, 1906.
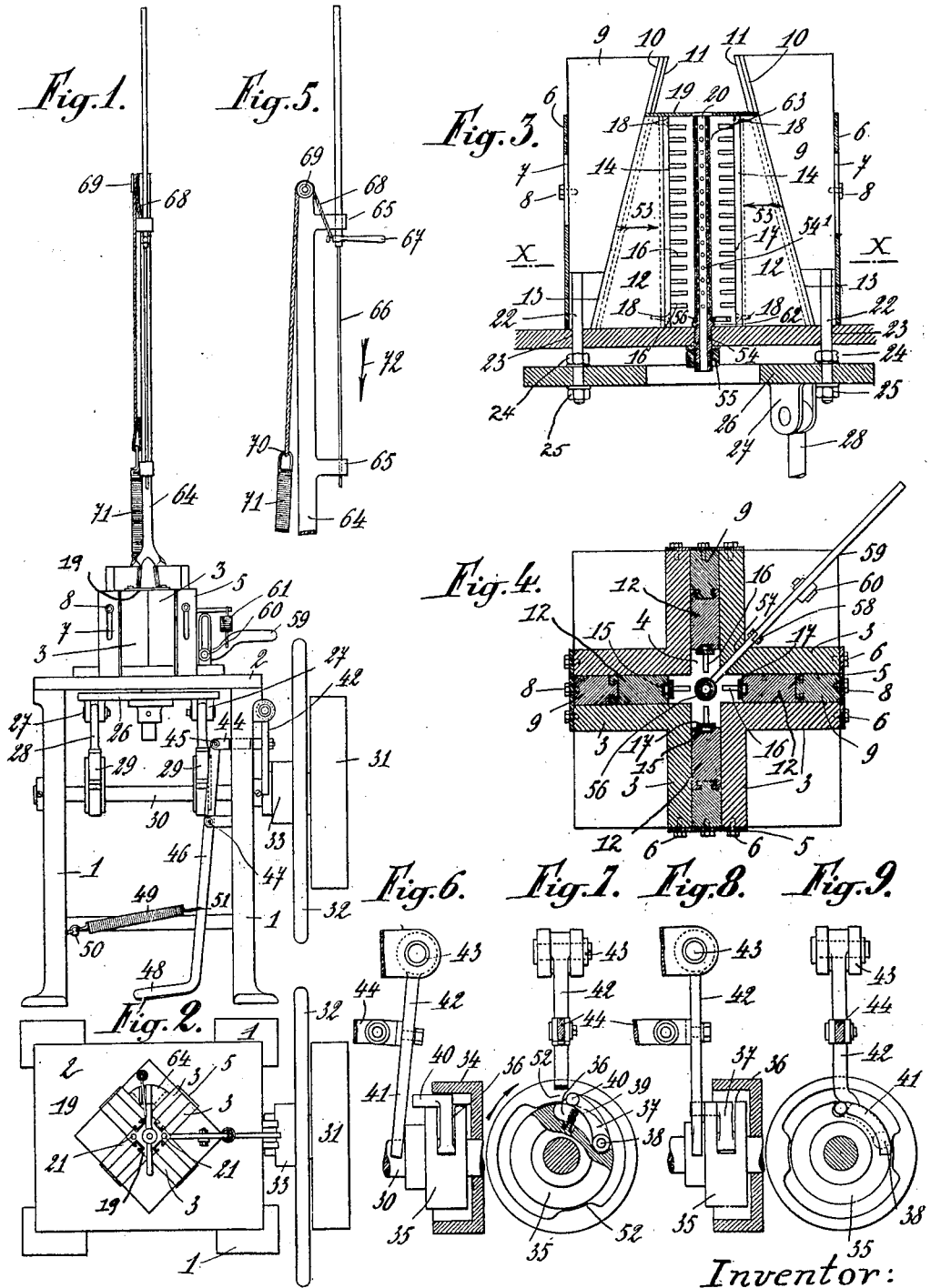
Witnesses.
V. E. Nichols
M. C. Powell
Inventor:
Jean Gohy
By Griffin Bernhard
Attorneys

UNITED STATES PATENT OFFICE.

JEAN GOHY, OF ENSIVAL, NEAR VERVIERS, BELGIUM.

MACHINE FOR PERFORATING PAPER TUBES.

No. 888,080.

Specification of Letters Patent.

Patented May 19, 1908.

Application filed November 6, 1906. Serial No. 342,289.

*To all whom it may concern:*

Be it known that I, JEAN GOHY, a subject of Belgium, residing at Ensival, near Verviers, in the Kingdom of Belgium, have invented new and useful Improvements in Machines for Perforating Paper Tubes, of which the following is a specification.

This invention relates to a machine for perforating cylindrical and conical cop-tubes of paper, the purpose of the machine being to produce a row or rows of holes in the wall of a tube, directed towards the axis of the latter, in order to allow of using the tube for conducting liquid, such as liquid dye, to textile thread wound on the tube.

The machine is so designed that a row or a plurality of rows of holes in the wall of the tube can be produced by a single operation without necessitating movement of the tube with regard to the perforating tools or members.

The invention essentially lies in the novel combinations of parts hereinafter described and set forth in the claims.

In the annexed drawings Figure 1 is an elevation of the entire machine, Fig. 2 a plan-view thereof, Fig. 3 an elevation, partly in section, illustrating on a larger scale the mechanism for operating the perforating tools, Fig. 4 a horizontal section on the line X—X of Fig. 3, and Fig. 5 a detail-view of the device for ejecting the fragments of papers cut out by the perforators; Figs. 6 to 9 are detail-views of the mechanism controlling the perforators, Fig. 6 being a front-elevation partly in section, Fig. 7 a corresponding side-view, with the parts in gear, and Figs. 8 and 9 corresponding views showing the parts out of gear.

As shown in Figs. 1 and 2 the machine comprises a frame 1 supporting a table 2 on which are provided a suitable number of guides 3, the latter being arranged in pairs to form slide-ways for perforating-tools. In the example illustrated four guides 3 are provided, arranged cross-wise (Fig. 4) to form four guide-ways 4. Each of the latter serves for one series or row of perforators. Plates 5 are fixed to the guides 4 by means of screws 6 in order to form the outer walls of the guide-ways 4, and each of the said plates is provided with a slot 7 through which passes a screw 8 screwed to a block 9 arranged within the respective guide-ways. The inclined inner surface 10 of each block 9 is provided with a rib 11 of T-section, which engages a correspondingly shaped groove formed in a block 12 having an inclined face 13 adjacent the surface 10 of the block 9. The inner vertical surface 14 of each block 12 is provided with a groove or recess 15 in which are located the heads of a series of perforating tools 16 inserted into a plate 17 fixed by means of a screw 18 to the block 12. The apparatus thus comprises four series of perforators, 16, each of which is fixed to a block 12 arranged between two guides 3 and in contact with the inclined guide-surface 10 of a block 9. A plate 19 with a central aperture 20 is fixed by screws 21 to the inner corners of the guides 3 (Fig. 2), to close at the top the space between the blocks 12.

To each block 9 is fixed a rod 22 which passes through a hole 23 in the table 2 and is fixed by means of nuts 24 and 25 to a plate 26 provided with lugs 27; to the latter are pivoted rods 28 connected to two eccentrics 29 fixed to a driving shaft 30 rotating in suitable bearings with which the frame 1 is provided. The shaft 30 is intermittently rotated by means of a pulley 31 which is fixed to a fly-wheel 32 and drives the shaft by means of a clutch 33 shown in detail in Figs. 6 to 9.

The clutch 33 comprises a box 34 rigidly fixed to the fly-wheel 32 and normally freely rotatable on the shaft 30 with the said fly-wheel and the pulley 31. Within the box 34 is located a sleeve 35 fixed to the shaft and provided with a recess 36 in which an arm 37 is pivoted at 38. A spring 39 tends to thrust the arm 37 outwards into contact with the inner surface of the box 34. The arm 37 has a projection 40 which extends out of the box into the path of the curved end 41 of an arm 42 pivoted at 43 to the frame 1 of the machine. The said arm 42 is controlled by means of a rod 44, which is fixed thereto and pivoted at 45 to a double-armed lever 46 fulcrumed at 47; the lever 46 terminates at its lower end in a pedal 48. A spring 49 connected at 50 to the frame 1 and at 51 to the lever 46 exerts on the latter a pull which moves, or tends to move, the end 41 of the arm 42 into the plane of rotation of the part 40. The box 34 is provided with two internal bosses 52 so arranged that when the part 41 is removed from the part 40 (Fig. 6), and the spring 39 thrusts the arm 37 outwards, the part 40 engages one of the said bosses. Rotation imparted to the pulley 31, fly-wheel 32 and box 34 is then transmitted to the sleeve 35 and shaft 30. The pulley 31 may be continuously driven by means of a belt, and does not impart motion to the shaft 30 while the arm 42 is in the position shown in Figs. 1, 8 and 9, the arm 37 being then held out of contact with the box 34 by the engagement of the part 40 by the arm 42; the box 34 can thus rotate freely on the shaft 30 without actuating the latter. When, on the other hand, pressure is exerted on the pedal 48 to remove the part 41 from the part 40 (Figs. 6 and 7), the arm 37 is thrust outwards as described and engages one of the bosses 52, so that the rotation of the box 34 is transmitted to the sleeve 35 and shaft 30. The actuation of the eccentrics 29 by the shaft 30 causes upward and downward motion to be imparted to the plate 26, rods 22 and blocks 9, so that the latter are vertically moved between the guides 3, while the screws 8 move in the slots 7 provided for that purpose in the plates 5. The lowering of the blocks 9 causes the blocks 12 to be displaced between the guides 3 in the directions indicated in Fig. 3 by arrows 53; that is to say the blocks 12 are simultaneously moved towards the center of the table 2.

At the center of the table 2 a hollow pillar 54 is fixed to the latter by means of a screw 55 or other suitable device, the said pillar being provided with series of holes 54¹ corresponding in number to the perforators 16. A ring 56 (Fig. 4) placed on the pillar 54 is fixed to a rod 57 which passes through an aperture provided in one of the guides 3 and is fixed by a bolt 58 to a lever 59 fulcrumed on a suitable support 60. A spring 61 (Fig. 1) acting on the lever 59 tends to press the ring 56 against a collar 62 which is formed on the pillar 54 and rests on the table 2.

The tube 63 to be perforated is placed on the pillar 54, as shown in section in Fig. 3. To effect the perforation of the said tube the arm 42 is removed from the part 40 in the manner hereinbefore described, momentary pressure on the pedal 48 being all that is required for this purpose. The clutch-box 34 thereupon imparts rotation to the shaft 30 and causes the blocks 9 to be lowered and raised. Movement of the blocks 12 towards the center of the table thus takes place and causes the perforators 16 to perforate the tube 63 and enter the holes 54¹, whereupon the said perforators are withdrawn again. The outer end of the lever 59 is thereupon depressed for the purpose of lifting the paper-tube 63 by means of the rod 57 and ring 56; the tube is thus caused to pass through the hole 20 in the plate 19, and can be withdrawn from the machine.

The disks of paper punched out of the tube 63 by the perforators 16 are thrust into the hollow pillar 54. A special device is provided for removing these disks. This device comprises a support 64 (Fig. 1) fixed to the table 2 between two of the guides 3 (Fig. 2) and provided with horizontal projections 65 serving as guides for a rod 66. The latter is provided with a handle 67, to which is attached one end of a cord 68 passing over a pulley 69 and connected at 70 to one end of a spring 71 the other end of which is attached to the table. The spring 71 normally holds the rod 66 in an elevated position above the pillar 54. When it becomes necessary to remove from the latter the disks of paper thrust through the holes 54¹, the handle is moved downwards in the direction indicated by the arrow 72 in Fig. 5, and the rod 66 is thus thrust into the pillar 54 and pushes the accumulated fragments of paper through the open lower end of the latter.

In the construction illustrated four rows of perforators 16 are provided, and consequently four pairs of guides 3, four blocks 9 and four blocks 12. It is, however, obvious that the number of these parts varies according to the number of rows of holes to be made in the paper-tube. The number of rows of holes provided in the pillar 54 varies, of course, accordingly.

What I claim as my invention and desire to secure by Letters Patent of the United States is:—

1. In a machine of the class described, a vertical perforated pillar open at its lower end for the exit therefrom of punched material, a plurality of horizontally-slidable supporting members grouped around said pillar externally thereof, a plurality of perforators carried by each of said supporting members, a plurality of vertically movable operating devices each coöperating with one of said supporting members, means for limiting each operating device to travel in a vertical path, and means whereby the operating devices are actuated simultaneously for moving the plurality of perforators in like manner relative to said perforated pillar.

2. In a machine of the class described, a perforated pillar adapted to receive the material to be treated, a plurality of supporting members grouped around said pillar, externally thereof, a plurality of perforators carried by each of said supports and movable therewith relative to the perforated pillar, a plurality of operating devices coöperating individually with said supports, said supports and the operating devices being provided with opposing cam surfaces, whereby a sliding movement of the operating devices imparts similar movement to the supports relative to the perforated pillar, and means for actuating the operating devices simultaneously, for moving all the perforators relative to the pillar.

3. In a machine of the class described, a fixed perforated pillar, a plurality of supports each adapted for sliding movement relative to the pillar while retaining a parallel relation thereto, a plurality of operating devices each limited to sliding movement in a path parallel to the axis of the pillar, each operating device having a sliding and wedging engagement with one of said supports, perforators carried by said supports, and means for imparting endwise movement to the operating devices simultaneously, whereby the supports and the perforators are moved toward and from the pillar.

4. In a machine of the class described, a table, a hollow perforated pillar, series of perforating tools arranged externally with respect to said pillar, horizontally movable supports for said series of tools, guides for said supports, vertically movable devices operating between said guides and coöperating with said supports for simultaneously moving them relative to the pillar, and means for imparting upward and downward movement to said support-operating devices.

5. In a machine of the class described, a hollow fixed perforated pillar, a plurality of movable supports located externally of said pillar, a plurality of perforating tools each carried by each of said supports, guides for said supports, cam-parts integral with said supports, vertically movable blocks operating in said guides and coöperating with said cam-parts, and means for vertically reciprocating said blocks, whereby the plurality of supports are actuated simultaneously for moving the plurality of series of perforators relative to the perforated pillar.

6. In a machine of the class described, a hollow fixed perforated pillar, a plurality of series of perforating tools in alinement with the perforations in said pillar, a plurality of horizontally movable supporting blocks located externally of the pillar and each carrying one series of tools, said blocks being provided with inclined surfaces, guides in which operate said supporting-blocks, vertically movable actuating-blocks having inclined surfaces which coöperate with the inclined surfaces of said supporting blocks, rods fixed to said actuating blocks, a plate fixed to said rods, and means for vertically reciprocating said plate, whereby the supporting blocks are operated simultaneously for moving the plurality of series of perforators relative to the perforated pillar.

7. In a machine for the purpose set forth the combination with a frame of a table supported by said frame, a hollow pillar supported by said table and provided with series of holes, series of perforating tools in alinement with said holes, horizontally movable supporting blocks carrying said series of tools and provided with inclined surfaces, guides for said supporting-blocks, vertically movable actuating-blocks with inclined surfaces adapted to coact with the inclined surfaces of the supporting blocks, rods fixed to said actuating blocks, ribs of dove-tail section formed on the inclined surfaces of said actuating-blocks, grooves of dove-tail section formed in the inclined surfaces of said supporting-blocks, and engaged by said ribs, rods fixed to said actuating-blocks, a plate fixed to said rods, eccentrics adapted to reciprocate said plate, and a shaft adapted to intermittently rotate said eccentrics.

8. In a machine of the class described, a perforated pillar, a plurality of wedge blocks slidable relative to said pillar, a series of perforators carried by each of said blocks, operating wedges coöperating with said blocks for moving the same simultaneously toward and from said pillar, a shaft, reciprocating means operated by the shaft and connected with the operating wedges for imparting sliding movement simultaneously to said operating wedges, and means controllable at will for driving said shaft.

9. In a machine of the class described, a perforated pillar, wedge shaped blocks slidably mounted for movement toward and from said pillar, perforating tools on said blocks, slidable wedges for moving said blocks towards and from said pillar, an external ejecting ring surrounding said pillar for sliding movement thereon, and a lever for moving said ring lengthwise of said pillar.

10. In a machine of the class described, a hollow vertical pillar provided with series of holes and open at its lower end for the escape by gravity of punched material, series of perforating tools, supporting-wedges to which said series of perforating tools are fixed, sliding wedges for moving said supporting wedges towards and from said pillar, an ejecting ring surrounding said pillar, a lever for moving said ring on said pillar, and a vertically movable rod adapted to be thrust into said pillar for expelling punched material therefrom.

11. In a machine for the purpose set forth the combination with a frame of a table supported by said frame, a hollow pillar supported by said table, and provided with series of holes, series of perforating tools in alinement with said holes, supporting-blocks to which said series of perforating tools are fixed, vertically movable actuating-blocks adapted to reciprocate said supporting-blocks, eccentrics connected to said actuating blocks a shaft to which said eccentrics are fixed, a sleeve fixed to said shaft, a spring-pressed lever fulcrumed on said sleeve, a rotating box surrounding said sleeve, and provided with bosses adapted to be engaged by said lever, means for rotating said box, and means for holding said lever out of engagement with said bosses, substantially as described.

12. In a machine of the class described, a hollow perforated vertical pillar adapted to receive the material to be treated, said pillar being open at its lower end for the escape therefrom by gravity of punched out material, a plurality of perforators externally of said pillar, means for moving the perforators relative to the pillar, whereby said perforators are adapted to punch holes in the material and to force the punched out material into said hollow pillar, and expelling means operating externally of said pillar for removing said punched out material from said pillar.

13. In a machine of the class described, a hollow perforated vertical pillar adapted to receive the material to be treated, said pillar being open at its lower end for the escape therefrom by gravity of punched out material, a plurality of perforators externally of said pillar, means for moving the perforators relative to the pillar, whereby said perforators are adapted to punch holes in the material and to force the punched out material into said hollow pillar, a plunger rod adapted to slide lengthwise of said pillar for removing the punched out material therefrom, and means for operating said plunger rod.

14. In a machine of the class described, a normally exposed upright pillar provided with perforations, perforators positioned externally with respect to said pillar, means for moving said perforators relative to the pillar, and ejecting means slidable externally on said pillar and adapted to displace therefrom the material which is to be fitted externally on said pillar.

15. In a machine of the class described, a perforated vertical pillar adapted to receive the material to be treated, a plurality of perforators externally of said pillar, means for moving the perforators relative to said pillar, an annular ejector externally of and slidable relative to the pillar for removing the material therefrom subsequent to the operation of punching the material, means for operating said ejector, and means for normally lifting the ejector to a position above said pillar.

In testimony whereof I have signed my name to this specification in the presence of two subscribing witnesses.

JEAN GOHY.

Witnesses:
  F. GRATTY,
  A. PENDLETON CRUGER.